Oct. 17, 1933.  W. F. MacGREGOR  1,930,855
COMBINATION HARVESTER-THRESHER
Filed May 14, 1932   3 Sheets-Sheet 1
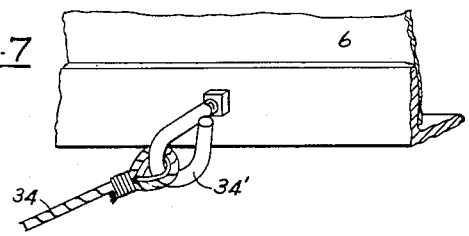
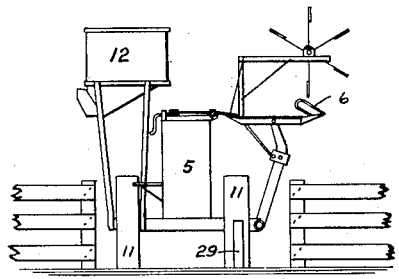
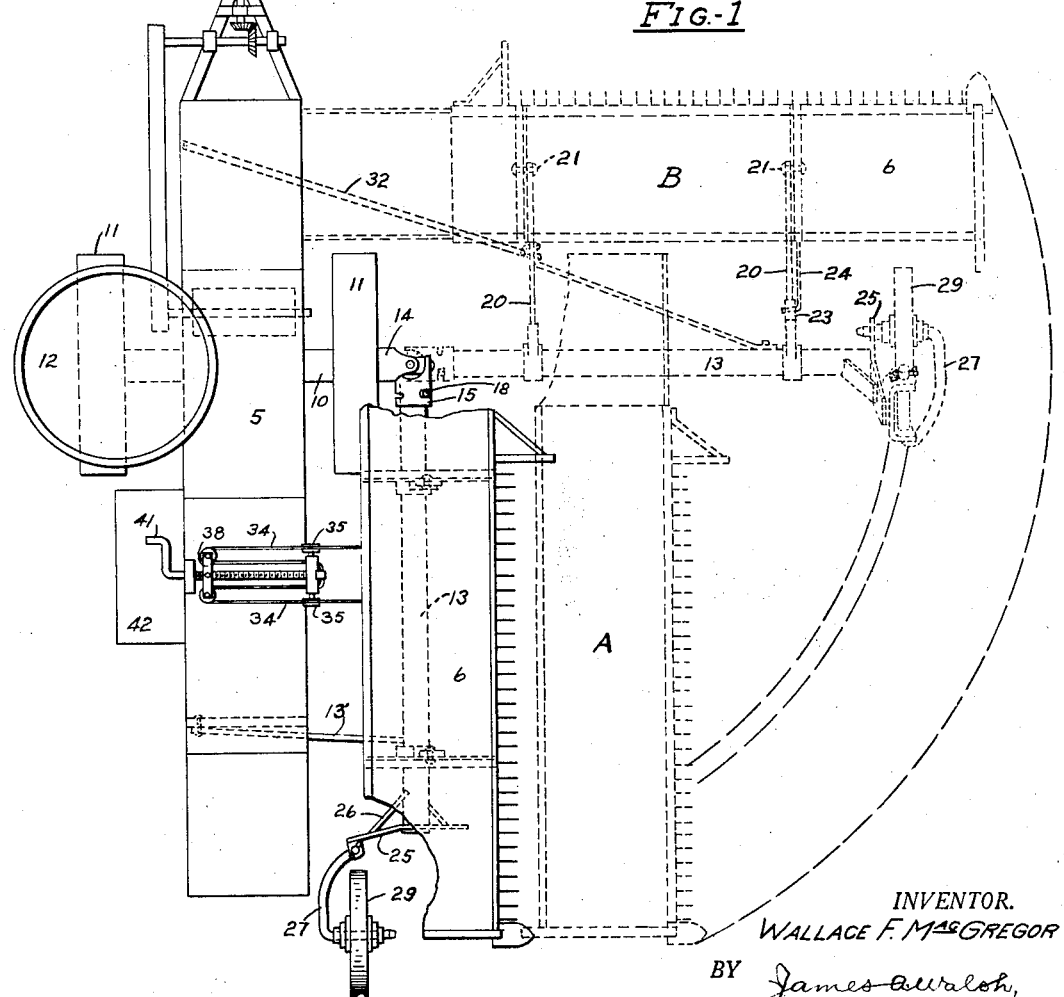
INVENTOR.
WALLACE F. MacGREGOR
BY James A. Walsh,
ATTORNEY

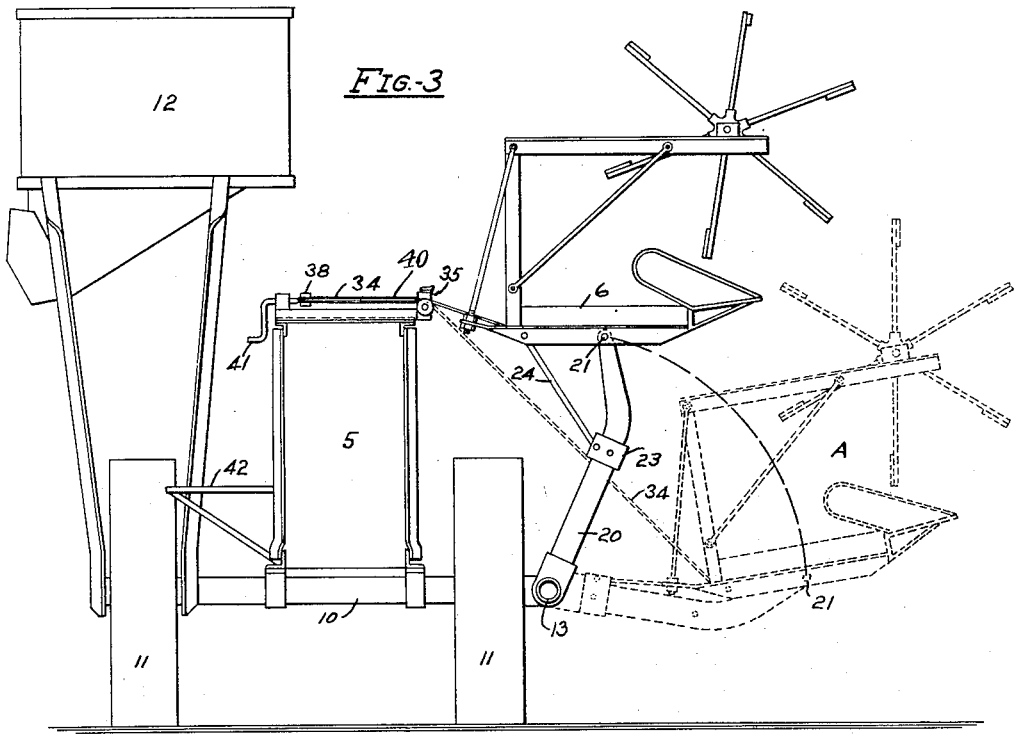
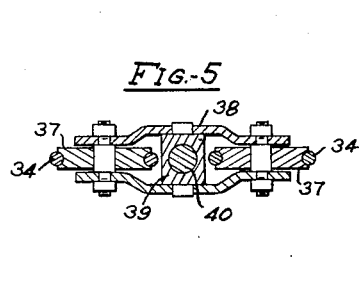
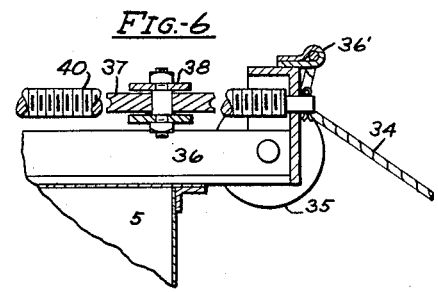
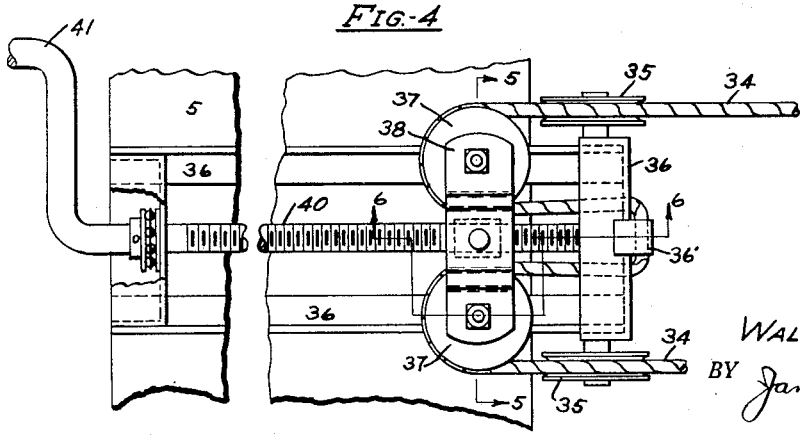

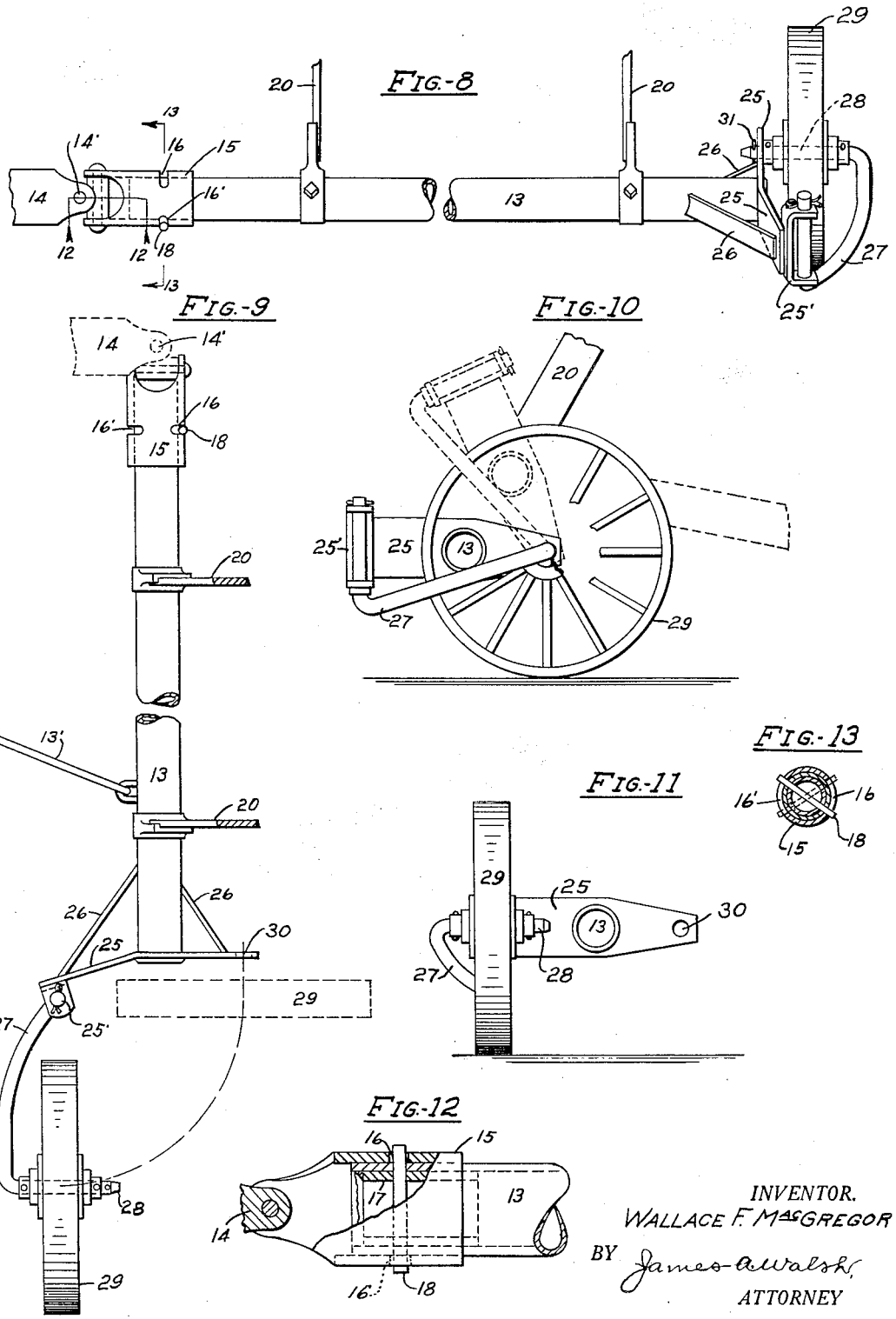

Patented Oct. 17, 1933

1,930,855

UNITED STATES PATENT OFFICE 1,930,855

COMBINATION HARVESTER-THRESHER

Wallace F. MacGregor, Racine, Wis., assignor to J. I. Case Company, Racine, Wis., a corporation Application May 14, 1932. Serial No. 611,302

22 Claims. (Cl. 56—20)

My present invention relates to that type of combination harvester-threshers adapted to be folded for reducing the width of the machine as a whole so that it may be readily adjusted to pass through gateways, narrow roads and the like, my object being to provide means for connecting and mounting the harvester element in relation to the thresher whereby the harvester may be quickly adjusted to grain cutting condition in the field and folded alongside the thresher for transportation, as desired, and sustained during its movements in horizontal position.

In the accompanying drawings, forming part hereof, Figure 1 is a plan view of a combine embodying my improvements; Fig. 2, a rear elevation on a reduced scale showing the machine in folded condition as when passing through a gateway; Fig. 3, a rear elevation showing the header in dotted lines after having been swung around alongside the thresher and in full lines when elevated to transport position; Fig. 4, a fragmentary plan view showing a block-and-tackle system employed for drawing the header into folded position; Figs. 5 and 6, detail sectional views taken on the dotted lines 5—5 and 6—6, respectively, in Fig. 4; Fig. 7, a detail showing a cable attachment for elevating the header; Fig. 8, a plan of the header support when said header is in normal cutting position; Fig. 9, a plan of the header support when the latter has been swung to folded position and also indicating the position assumed by the grain-wheel; Fig. 10, an end elevation of the grain wheel and associated parts showing the wheel supporting arm in dotted lines when the header is in cutting position and in full lines after the header has been folded and before releasing the wheel; Fig. 11, a rear elevation of the grain-wheel when in the position shown in Fig. 9; Fig. 12, a detail section showing the engaging mechanism employed with the header support or axle, taken on the dotted line 12—12 in Fig. 8; and Fig. 13 is a detail section taken on the dotted line 13—13 in Fig. 8.

In said drawings the numeral 5 indicates the thresher and 6 the harvester elements respectively of a combine, adapted to be drawn by a tractor 7 and actuated by its power take-off shaft 8, Fig. 1, in a manner well known, or otherwise. The thresher is mounted on an axle 10 having supporting wheels 11, as usual, and a grain bin 12, and to which axle or other support associated with the thresher I connect the header support or axle section 13 by means of a universal coupling comprising the members 14, 15, the latter having oppositely disposed slots 16, 16', in its sides. The support 13, as indicated, is preferably of tubular form and has welded or secured thereto in its interior a reinforcing member 17, which end of the axle is inserted in the coupling 15, after which a pin 18 is driven through this reinforced portion so that its ends will project through the slots 16, 16', Fig. 12, for a purpose to appear.

The header 6 is connected to the support 13 by arms 20 fixedly secured to the axle, the outer ends of which arms, at 21, are pivotally connected to the header platform, and on one of said arms is a sliding collar 23 having a link 24 connected thereto and to the header, Fig. 3. The outer end of section 13 has an arm 25 fixedly secured thereto, preferably by welding, and which elements are braced by the bars 26 welded thereto, the arm being in the position indicated by dotted lines, Fig. 10, when the header is in cutting position. In one end of the arm 25, at 25', I pivotally mount an axle 27 terminating in or having attached thereto a horizontal support or spindle 28 upon which a wheel 29 is mounted, and which axle normally is in the dotted line position, Fig. 10, the support 28 being connected in a bearing 30 on the arm 25 by a pin 31, so that wheel 29, as indicated in Fig. 8, will be fixedly secured as a grain-wheel when the header is in cutting position. A brace rod 13' may be attached to the thresher and connected to section 13 to maintain the latter in parallel relation with the thresher as and when the header has been elevated. It will be understood that the axle 10, including its coupled section for supporting the harvester, is so connected to the thresher 5 as to rock from end to end, and that the thresher constitutes a counter-balance against the weight of the harvester while being adjusted to the height of grain to be cut, in the manner substantially as disclosed by reissued Patent No. 16,378, granted July 6, 1926, upon my application.

When it is desired to fold the header alongside the thresher for transport purposes the brace 32 is detached, when by means of the wheel 29 and the vertical coupling pin 14' said header may be rolled rearwardly so that it will occupy the position A indicated by the dotted lines in Figs. 1 and 3. When thus adjusted I secure the ends of cables or ropes 34 to hooks, as 34', Fig. 7, approximately medianly of the header platform, Fig. 1, which cable strands pass over sheaves 35 supported on a frame 36 mounted on the thresher deck, to which frame, at 36', the cable is fixedly secured, thence about pulleys 37 supported by a follower 38 including a trunnion 39, which latter is in turn mounted on a screw-shaft 40 having a handle 41 within convenient reach of an attendant on a platform 42, Fig. 3. The relation of the cable strands to the header when the latter is about to be raised is indicated by dotted lines A in Fig. 3, and upon turning the screw-shaft 40 in the proper direction the follower 38 is drawn across the thresher deck, causing pulleys 37 to pull upon the cable strands 34, which gradually shorten as the follower travels along the screw-shaft, at the same time raising the arms 20, which, through their pivotal connection, at 21, with the header platform, guides the latter into the position shown by full lines in Fig. 3, and by which connection the header is constantly maintained in horizontal position throughout its adjustments. During this upward movement of the arms 20 the collar 23, which is slidably mounted on one of said arms and connected to the header by the link 24, is moving upwardly from the position shown in dotted lines in Fig. 3 and held in fixed relation by a pin inserted in the hole in collar 23 as shown, so that in this simple manner the arms and header become automatically braced and the header maintained in the horizontal position indicated after being so elevated by the cable. While the upward movement of the arms and header are occurring the header axle or support 13, being fixedly secured to said arms 20, is rocked in the coupling 15 by the arms and which therefore assists in the lifting operation, but as it is desired to properly position and so maintain the elevated header the movement thereof toward the thresher is controlled by the pin 18 in said section 13, which pin, as will be apparent from Figs. 8 and 9, engages opposite ends of slots 16, 16' and therefore limits the turning movement of section 13 to hold the header in predetermined proximity to the thresher.

When the header has been folded in the manner described the combine is ready for transport, but before it is moved the grain-wheel 29, which occupies the transverse position indicated by dotted lines in Fig. 9, is released from its bearing 30 in the arm 25, by removing pin 31, whereupon, as the machine moves, said wheel, through friction with the ground, will be caused to pivot at the connection 25' with its axle 27 and the arm 25, and be thereby converted into a caster-wheel adapted to support and trail with the header as the machine travels, as indicated in Figs. 1, 2 and 9, but which wheel has been omitted from Fig. 3 for purposes of clearness, and upon which occurrence the header axle 13 and the arm 25 with associated parts become lowered to substantially the position indicated by full lines in Fig. 10.

It will be understood, of course, that upon entering a field for harvesting purposes the brace-rod 13' is released and the screw-shaft 40 is turned in reverse direction, when the header will be lowered to the dotted line position A, Figs. 1 and 3, by gravity, and through the influence of axle 13, which rocks in reverse direction until its pin 18 engages opposite ends of slots 16, 16', said axle will be limited in its turning movement, and during such action the arms 20 and brace 24 will assume the dotted line position shown in Fig. 3. The header is then ready to be unfolded into cutting position B, Fig. 1, and the caster-wheel is swung around to be reengaged with arm 25, when the attendant rolls the header forwardly to cutting position, in which the wheel 29, having been again secured to arm 25, serves as a fixed grain-wheel common to such machines, and upon replacing the brace 32 the combine will be again in proper condition for cutting and threshing the crop. In rockingly connecting the harvester support 13 to the thresher axle 10, and locking the support by the pin and slots as indicated, or in other equivalent manner, it will be seen that the harvester, Fig. 1, is rigidly held in grain cutting position, and that when the axle and support as a unit is rocked during varied adjustments of the harvester for the height of cut, the harvester follows the movements of the supporting unit; but when elevating the harvester, as indicated in Fig. 3, its support 13 rocks toward the thresher independently of the section supporting the latter by means of its pivotal mounting with the coupling 15.

In practice I am enabled to materially reduce the width of a combine equipped with my improved devices and to fold the elements in such compact relation that the machinery will readily pass through narrow gateways, culvert railings and over bridges, say nine feet wide, as the header will be elevated a sufficient height to slightly overhang and clear fences and other obstructions, so that in thus decreasing the width of such a cumbersome machine drawn by a tractor I avoid objections to its transportation over narrow roads, as ample room is left available for the passing of other vehicles; and other advantages are attained in that I may readily move the machine through ordinary barn doorways and storage places, while an attendant single-handed is enabled to fold and unfold the header and place the same in cutting or inoperative condition with but slight manual effort, so that with a tractor and combine, as indicated in Fig. 1, a one-man harvesting outfit is provided.

I claim as my invention:

1. In a machine of the class described, a thresher, a harvester having a support, means connecting said thresher and support whereby the harvester may be adjusted vertically and also horizontally to be folded alongside the thresher, means fixedly secured to the support and pivotally connected to the harvester for supporting the latter in horizontal position, and means associated with the thresher and adapted to be connected to the harvester when folded for rocking the support and drawing the pivotal connecting means and harvester upwardly and inwardly in proximity to the thresher for adjusting the harvester in horizontal position.

2. In a machine of the class described, a thresher, a harvester, an axle, means connecting the axle and thresher whereby the axle may be adjusted vertically and horizontally and also rocked in the connecting means, arms secured to the axle, a harvester platform pivotally mounted on the arms, and means associated with the thresher and adapted to be connected to the harvester when the latter and the axle are adjusted alongside the thresher whereby the axle may be rocked and the harvester elevated by the arms in substantially horizontal position in proximity to the thresher.

3. In a machine of the class described, a thresher, a harvester, a rocking support for the harvester, means for connecting the harvester to the support, means for flexibly connecting the support and thresher whereby the harvester may be adjusted vertically and horizontally and also swung into parallel relation with the thresher, a tackle on the thresher connected to the harvester, and means for operating the tackle to raise the harvester and simultaneously rock its support for moving the harvester in proximity to the thresher in substantially horizontal position.

4. In a machine of the class described, a thresher, a harvester, an axle supporting the harvester, means secured to the support and pivotally connected to the harvester for supporting the latter in horizontal position, means for flexibly connecting the axle and thresher whereby the harvester may be adjusted vertically and also horizontally alongside the thresher, a grain-wheel fixedly secured to the outer end of the axle for supporting the harvester in cutting position, means for releasing the grain-wheel when the harvester is swung alongside the thresher for transport whereupon said wheel assumes castering position, and flexible means on the thresher adapted to be connected to the harvester when horizontally adjusted for rocking its axle and simultaneously elevating the harvester in substantially horizontal position in proximity to the thresher.

5. In a machine of the class described, a thresher, a harvester, an axle supporting the harvester, means for flexibly connecting the axle and thresher whereby the harvester may be vertically and horizontally adjusted and the axle rocked, means associated with the connecting means for limiting the rocking action of the axle, arms secured to the axle and pivotally connected to the harvester to maintain the latter in horizontal position, a brace on the harvester and slidably mounted on its arm for following the movement of the latter to continuously sustain the harvester in horizontal position, and means on the thresher for raising the arms and harvester and rocking the axle to draw the harvester in elevated position in proximity to the thresher.

6. In a machine of the class described, a thresher, a harvester, a support for the harvester flexibly connected to the thresher whereby the harvester may be horizontally adjusted, arms on the support normally lying in horizontal position, said harvester being pivotally mounted on the arms, flexible means on the thresher and adapted to be secured to the harvester when adjusted horizontally for drawing the arms and harvester upwardly and inwardly toward the thresher said harvester being constantly sustained in horizontal position by the arms, and means associated with said drawing means whereby the arms and harvester may be lowered and constantly maintained in horizontal position.

7. In a machine of the class described, a thresher, a harvester, an axle for the harvester, means connecting the harvester to the axle, a coupling flexibly connecting said thresher and axle whereby the harvester may be vertically and horizontally adjusted, an arm on the outer end of the axle, a wheel pivotally connected to the arm, means for fixedly engaging the wheel with the arm to serve as a grain-wheel when the harvester is in normal cutting condition and to disengage the arm and wheel so that the latter will serve as a caster-wheel when the harvester is folded alongside the thresher, and means associated with the thresher and adapted to be secured to the harvester when horizontally adjusted whereby the latter may be drawn upwardly in proximity to the thresher and lowered and maintained in horizontal position during its movements.

8. In a machine of the class described, a thresher, a harvester, an axle supporting the harvester, means for coupling the axle to the thresher whereby the axle may be vertically, horizontally and rockingly adjusted, means connecting the harvester to the axle, an arm on the axle, a support pivotally connected to the arm, a wheel on the support, means for detachably securing the support to the opposite end of the arm for maintaining the wheel in grain cutting condition and releasing said wheel to act as a caster when the harvester is folded, and means on the thresher and connected to the harvester for elevating, sustaining and lowering the harvester in constant horizontal position.

9. In a machine of the class described, a thresher, a harvester, means for flexibly connecting said elements whereby the harvester may be swung alongside the thresher, a screw-shaft on the thresher, a follower on the shaft having a pulley thereon, a cable passing about the pulley and connected to the harvester, and means for actuating the screw-shaft to propel the follower and draw the cable to elevate the harvester alongside the thresher.

10. In a machine of the class described, a thresher, a harvester, an axle supporting the harvester, a coupling for flexibly connecting the axle to the thresher whereby the axle may be rocked, means for limiting the rocking movement of the axle, arms fixedly secured to the axle, a harvester platform pivotally secured to the arms, a cable on the thresher and adapted to be connected to the harvester, and means for drawing the cable to rock the axle and pull said arms and harvester platform upwardly in proximity to the thresher to reduce the width of the machine for transportation and to lower the harvester to be positioned for grain cutting.

11. In a machine of the class described, a thresher, a harvester, an axle supporting the harvester, means connecting the axle to the thresher whereby the axle may be rocked and also horizontally adjusted to position the harvester in predetermined parallel relation to the thresher, means connecting the harvester to the axle, and flexible means on the thresher and adapted to be connected to the harvester for rocking the axle and raising the harvester from its outer position and drawing and elevating it nearer the thresher to be horizontally positioned in proximity thereto.

12. In a machine of the class described, a thresher, a harvester, an axle supporting the harvester, a coupling connecting the thresher and axle said axle being rockingly mounted in the coupling, means connecting the harvester to the axle, and flexible means on the thresher and adapted to be connected to the harvester for drawing the latter toward the thresher and simultaneously rocking the axle to support the harvester in substantially horizontal position.

13. In a machine of the class described, a thresher, a harvester having a support, means connecting the support to the thresher whereby the support may be rocked and adjusted horizontally, arms fixedly secured to the support and normally extending horizontally therefrom, a harvester pivotally mounted on the arms, and means on the thresher and adapted to be connected to the harvester when the latter and its support are adjusted horizontally in relation to the thresher for simultaneously rocking the axle, positioning the arms in vertical relation thereto and also elevating the harvester in constant substantially horizontal position in proximity to the thresher.

14. In a machine of the class described, a thresher, a harvester, a support for the harvester, an arm fixedly secured to the support and pivotally connected to the harvester for sustaining the latter, means connecting the support to the thresher whereby the harvester may be positioned in predetermined spaced parallel relation to the thresher, and means connected to the harvester for rocking the support to move said arms inwardly to substantially vertical position for elevating the harvester alongside of and in proximity to the thresher.

15. In a machine of the class described, a thresher, a harvester, a support for the harvester, means fixedly secured to the support and pivotally connected to the harvester for sustaining the latter, means for horizontally and rockingly connecting the support to the thresher whereby the harvester may be swung into parallel relation with the thresher and rocked to elevate the harvester in horizontal position alongside the thresher, means on the thresher and adapted to be connected to the harvester for elevating the latter, and means secured to the harvester and adjustably connected to the sustaining means for maintaining the harvester in horizontal position when elevated.

16. In a machine of the class described, a thresher, a harvester, a sectional axle supporting said elements including a coupling connecting the axle sections, and means associated with one of the sections whereby the axle in entirety may be rocked for adjusting the harvester to cutting positions and also whereby one of the sections may be rocked independently of the other when elevating the harvester alongside the thresher.

17. In a machine of the class described, a thresher, a harvester, an axle supporting the thresher, an axle supporting the harvester, a coupling connecting the axle sections whereby the harvester may be vertically, horizontally and rockingly adjusted for grain cutting, and means engaging the harvester supporting axle section and coupling whereby the section may be rocked independently of the thresher axle for elevating the harvester alongside the thresher.

18. In a machine of the class described, a thresher, a harvester, a support for the harvester, means connecting the support to the thresher whereby the harvester may be horizontally adjusted to folding position in relation to the thresher, and means associated with the support whereby the latter may be rocked when folded to elevate the harvester alongside of and in close proximity to the thresher.

19. In a machine of the class described, a thresher, a harvester, an axle supporting the harvester, a coupling connecting the thresher and axle, and a pin connecting the coupling and axle whereby the latter may be rocked in the coupling and its rocking action therein limited.

20. In a machine of the class described, a thresher, a harvester, a support connected to the thresher, arms on the support, a harvester platform pivotally connected to the outer ends of the arms, extensible and retractible means connecting the thresher and harvester to adjust said arms inwardly to elevate the harvester into proximity with the thresher and outwardly to lower the harvester to be positioned for grain cutting, and controlling means associated with the harvester for maintaining its platform in its normal horizontal position when elevated and lowered.

21. In a machine of the class described, a thresher, a harvester, vertically, horizontally and rockingly movable supporting means for the harvester connected to the thresher, means connecting the harvester and supporting means, means on the thresher and connected to the harvester for adjusting the connecting means inwardly to elevate the harvester in proximity to the thresher and outwardly for lowering the harvester to be positioned for grain cutting, and means for maintaining the harvester platform in horizontal position during its reverse movements and also when in elevated and lowered positions.

22. In a machine of the class described, a thresher, a harvester, a rocking support flexibly connected to the thresher, means connecting the harvester to said support whereby the harvester will normally lie in horizontal position for cutting grain and when folded alongside the thresher, means on the thresher connected to the harvester for rocking the support to elevate and to reverse the movement of the support to lower said harvester, and means for constantly maintaining the harvester in its normal horizontal position during its reverse movements and also when in elevated and lowered positions.

WALLACE F. MacGREGOR.